United States Patent [19]

Culley et al.

[11] Patent Number: 5,437,042

[45] Date of Patent: Jul. 25, 1995

[54] ARRANGEMENT OF DMA, INTERRUPT AND TIMER FUNCTIONS TO IMPLEMENT SYMMETRICAL PROCESSING IN A MULTIPROCESSOR COMPUTER SYSTEM

[75] Inventors: Paul R. Culley, Cypress; John A. Landry, Tomball; Dale J. Mayer; Christopher C. Wanner, both of Houston; Guy E. McSwain, Cypress, all of Tex.

[73] Assignee: Compaq Computer Corporation, Houston, Tex.

[21] Appl. No.: 955,683

[22] Filed: Oct. 2, 1992

[51] Int. Cl.6 ............................................. G06F 13/00
[52] U.S. Cl. ....................................... 395/800; 395/550; 395/425; 395/275; 364/230.2; 364/230.6; 364/240; 364/242; 364/242.3; 364/242.6; 364/DIG. 1
[58] Field of Search ................ 395/800, 775, 725, 425, 395/275, 550

[56] References Cited

U.S. PATENT DOCUMENTS

| H511 | 8/1988 | Stello | 364/200 |
|---|---|---|---|
| 4,086,627 | 4/1978 | Bennett et al. | 395/725 |
| 4,261,034 | 4/1981 | Saccomano et al. | 364/200 |
| 4,748,586 | 5/1988 | Bonci | 395/725 |
| 4,750,168 | 6/1988 | Trevitt | 370/85 |
| 5,282,272 | 1/1994 | Guy et al. | 395/275 |
| 5,283,904 | 2/1994 | Carson et al. | 395/725 |
| 5,287,523 | 2/1994 | Allison et al. | 395/725 |

FOREIGN PATENT DOCUMENTS

WO89/01662 2/1989 WIPO .

OTHER PUBLICATIONS

Intel Peripherals Databook, 1990, pp. 1-207-1-290.
Kommunikationstechnik, Kombination aus PC und Mainframe, Elektronik, vol. 41, No. 8, Apr. 14, 1992, pp. 30-32.
F. Schmidt-Föhre, VXI Mainframes-Gut Versorgt, Elektronik, vol. 41., No. 8, Apr. 14, 1988, pp. 104-108.
B. Gunnerson, Can Superservers Scale up to Enterprise Status?, Data Communications, vol. 20, No. 9, Jul. 1991, pp. 67-78.
C. Keating, A Fearful Symmetry, BYTE, vol. 15, Nol. 5, May 1990, pp. 221-228.

Primary Examiner—Alyssa H. Bowler
Assistant Examiner—Alpesh M. Shah
Attorney, Agent, or Firm—Pravel, Hewitt, Kimball & Krieger

[57] ABSTRACT

An arrangement of direct memory access (DMA), interrupt and timer functions in a multiprocessor computer system to allow symmetrical processing. Several functions which are considered common to all of the CPUs and those which are conveniently accessed through an expansion bus remain in a central system peripheral chip coupled to the expansion bus. These central functions include the primary portions of the DMA controller and arbitration circuitry to control access of the expansion bus. A distributed peripheral, including a programmable interrupt controller, multiprocessor interrupt logic, nonmaskable interrupt logic, local DMA logic and timer functions, is provided locally for each CPU. A bus is provided between the central and distributed peripherals to allow the central peripheral to broadcast information to the CPUs, and to provide local information from the distributed chip to the central peripheral when the local CPU is programming or accessing functions in the central peripheral.

7 Claims, 5 Drawing Sheets

ARRANGEMENT OF DMA, INTERRUPT AND TIMER FUNCTIONS TO IMPLEMENT SYMMETRICAL PROCESSING IN A MULTIPROCESSOR COMPUTER SYSTEM

BACKGROUND OF THE INVENTION

1. Field of the Invention

The present invention relates to the arrangement of DMA, interrupt and timer functions between a central peripheral mounted on the system board of a multiprocessor computer system and a distributed peripheral mounted on each microprocessor board to implement symmetrical processing.

2. Description of the Related Art

The personal computer industry is evolving quickly due to the increasing demand for faster and more powerful computers. Historically, computer systems have developed as single microprocessor, sequential machines which process one instruction at a time. However, performance limits are being reached in single microprocessor computer systems so that a major area of research in computer system architecture is multiprocessing. Multiprocessing involves a computer system which includes multiple microprocessors that work in parallel on different problems or different parts of the same problem. The incorporation of several microprocessors in a computer system introduced many design problems that were not present in single microprocessor architectures.

For example, the SystemPro by Compaq Computer Corp., which was based on the i386 or i486 microprocessors by Intel Corp., typically included a plurality of buses such as a host bus for interfacing one or more processors with main memory, an expansion bus such as the Industry Standard Architecture (ISA) or Extended ISA (EISA) bus which was used to interface with one or more optional and external plug-in logic circuit boards, and an X bus for interfacing with a plurality of peripheral devices such as a keyboard and a floppy disk controller. The processors typically shared the host bus for easy access to the main memory. Although it was desirable that each processor be relatively independent so that each processor could perform any particular task, design limitations have heretofore resulted in asymmetric systems.

In particular, the SystemPro included an EISA system peripheral (ESP) based on the 82357 integrated system peripheral (ISP) by Intel. The ESP incorporated many functions central to the entire system so that it was conveniently located on the expansion bus. The ESP included a programmable interrupt controller (PIC), an EISA bus interface, five internal timers for system timing functions, a DMA controller, a RAM refresh generator, NMI logic for indicating error conditions and other service conditions requiring immediate attention, and a system arbiter, which evaluates requests for the EISA bus from a plurality of sources such as DMA channels, refresh requests, and CPU requests as well as other bus master requests.

Since the ESP was centrally located and connected to the EISA bus, it was only feasible that one processor handle all of the maskable and nonmaskable interrupts and the timer functions as well as programming the DMA controller. Thus, only one processor interfaced with the ESP and had access to its functions while the remaining processor did not have access to the ESP and was limited to the remaining functions of the computer system. One reason for this asymmetric design was the difficulty in determining which particular interrupt was received by the ESP and thus the inability to determine which particular processor was supposed to handle the function. For example, the ESP received a plurality of interrupts but only provided one interrupt signal, so that there was no way of determining which particular interrupt was received and thus no way of assigning the proper processor to handle the interrupt. Another difficulty arose if a second processor interrupted the DMA programming sequence of a first processor. The second processor would alter the byte pointer and terminal count bits which would cause errors in programming when the first processor continued its programming sequence. Thus, although it was convenient to assign one processor to handle all of the ESP functions resulting in an asymmetric design, this design also restricted flexibility of programming, which degraded overall system performance.

Therefore, it is desirable to allow each of the other processors in a multiprocessor system access to certain of the functions previously located in the ESP to allow system flexibility so that a programmer can assign any task to a particular processor. Furthermore, it would be desirable to divide the functions between the processors in a compatible manner.

SUMMARY OF THE PRESENT INVENTION

In order to implement symmetric multiprocessing, the I/O system of the present invention previously performed by the ESP is essentially split into two parts. The first part is a common or central system peripheral (CSP) which replaces the ESP and retains certain functions which are central to the system that are conveniently accessed through the expansion bus. There is only one CSP in the preferred embodiment. Those functions which are local or which are associated with a particular processor are provided in a distributed system peripheral (DSP) which is included with each processor in the multiprocessor system. Each DSP is used as a support chip for each processor and cache subsystem. The CSP works very closely in conjunction with all of the DSPs and thus a communication link, referred to as a MUX bus, is provided to allow communication between the CSP and each of the DSPs.

The CSP combines in one chip the DMA controller, the EISA arbitration controller, numerous system board logic functions and a MUX bus controller or interface. The CSP retains the DMA controller and most of the DMA functions to allow each of the processors and the I/O devices to access the DMA functions. The CSP also retains the RAM refresh controller and receives several system interrupt signals and transfers corresponding interrupt signals to the DSPs via the MUX bus. The CSP further latches several NMI interrupts on the system board and transfers these NMI interrupts to the DSPs via the MUX bus. All of the system and NMI interrupts can be enabled or disabled for each processor, allowing the system programmer flexibility in assigning tasks to each processor.

Each DSP is mounted onto a corresponding CPU board and implements a local programmable interrupt controller (PIC), local timers, processor I/O logic comprising CPU control and status registers, local DMA logic and miscellaneous processor and cache logic for use in a symmetrical multiprocessor architecture. The DSP preferably interfaces with its local processor through a cache controller interface and cache buffers using a local I/O bus. The DSP interfaces with the CSP through the MUX bus. The local I/O bus allows processors to access their local registers without encountering the overheads of the host and EISA buses as in prior systems. The MUX bus allows other CPUs and system devices to access a CPU's local registers.

All of the DSPs store the system interrupt signals broadcasted by the CSP via the MUX bus. A few local interrupts are also generated within the DSPs. These interrupt signals are provided to the local PIC within each DSP, which is implemented in a very similar and compatible manner as the PIC in the ESP. Thus, a system programmer may assign any or all interrupts to one processor and mask out the remaining interrupts for other processors to handle. Furthermore, multiprocessor interrupt sharing logic is included which allows CPU programmable interrupts and other interrupt sources to be shared at any interrupt level, thus allowing for greater software flexibility in a multiprocessor environment. The organization according to the present invention allows symmetrical and flexible system interrupt handling.

The Local DMA logic includes byte pointer flip-flops which provide DMA byte pointer bits and a register to maintain DMA terminal count bits typically stored only in DMA status registers. Thus, each processor has its own copy of these bits so that it also has full independent control over DMA functions. One DSP provides these bits to the CSP via the MUX bus when its CPU is programming the DMA controller in the CSP. A CPU programs the DMA controller by accessing the CSP with a cycle on the expansion bus. Each DSP includes a cycle tracker to detect when its CPU is programming the DMA controller, so that only the appropriate DSP responds with the byte pointer and terminal count bits. The DSP also includes local interval timers so that every processor has its own set of timers. All accesses to the timer registers are preferably local accesses to the processor.

Therefore, the arrangement of the interrupt and DMA controllers and timer functions of the present invention allow symmetric processing in a multiprocessor computer system. Those functions that are required as separate and associated with a given CPU are provided locally in the local DSP. Those functions containing central logic requiring access through the expansion bus are provided on the CSP to allow access by all the CPUs and other I/O devices. A separate MUX bus interface is provided between the CSP and each of the DSPs to closely couple the distributed peripheral functions with the central functions of the multiprocessor computer system. In this manner, the present invention allows symmetric multiprocessing providing a programmer flexibility to assign whatever tasks desirable to particular microprocessors to enhance system performance.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
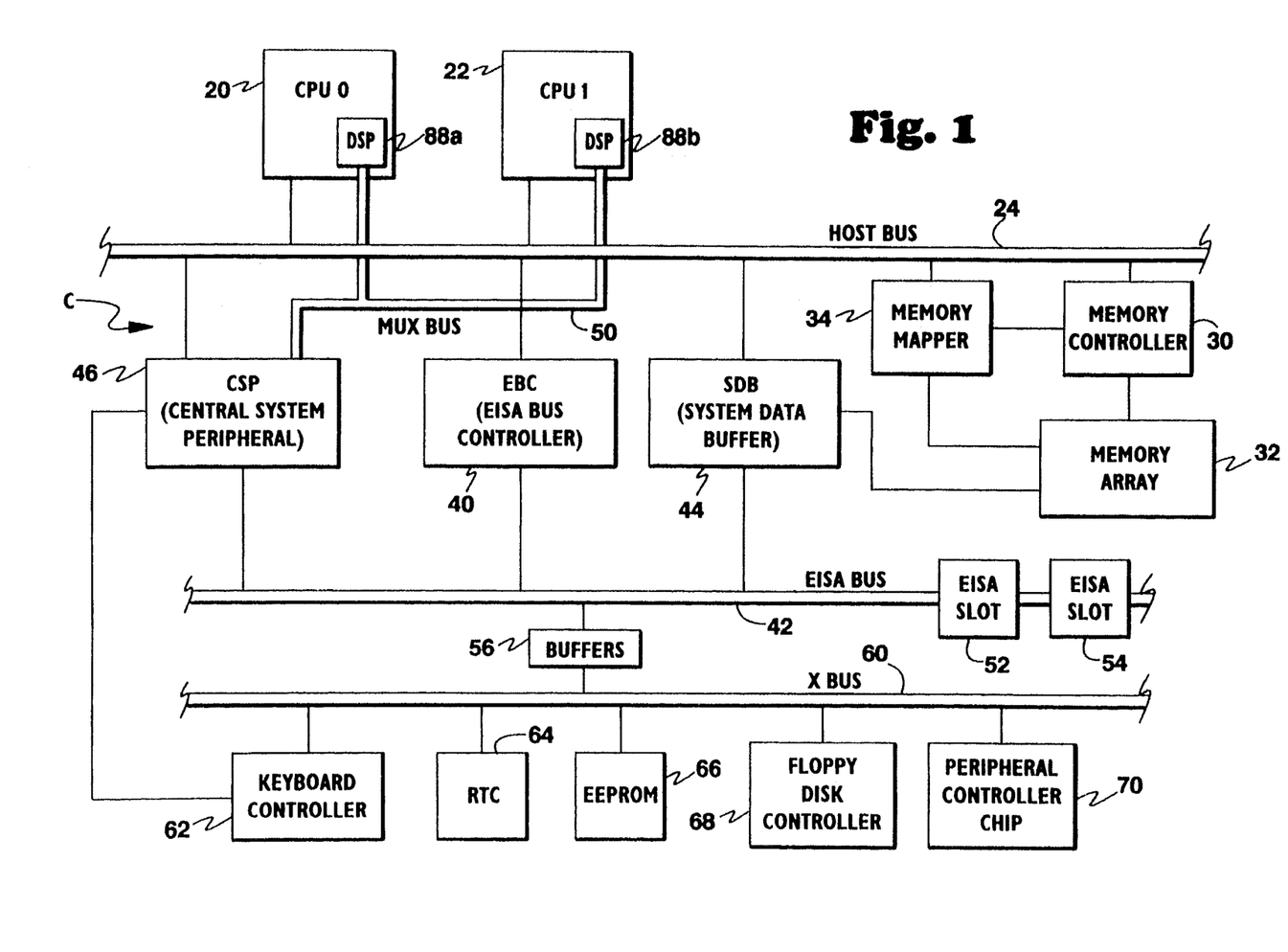
FIG. 1 is a block diagram of a computer system organized according to the present invention.

Referring now to FIG. 1, a computer system C is shown, which is preferably a multiprocessor system comprising two central processing units (CPUs) in the preferred embodiment, although the present invention may be incorporated into a system including a single CPU or more than two CPUs. The elements of the computer system C that are not significant to the present invention, other than to illustrate an example of a fully configured computer system, are not discussed in detail. Most of the functions and device blocks shown in FIG. 1 are preferably mounted on a system board (not shown).

The computer system C preferably includes two CPUs, referred to as CPU 20 and CPU 22, respectively, which are connected to a host bus 24. The CPUs 20 and 22 may also be referred to as CPU0 and CPU1, respectively, indicating logical port assignments as shown in FIG. 1. In the preferred embodiment, at least two CPU connectors are connected to the host bus 24 for receiving interchangeable CPU cards, where the CPUs 20 and 22 are essentially identical in configuration and function. The port assignments are initially determined by the physical slot that a CPU card is plugged into, although logical port assignment is preferably programmable. A memory controller 30 is coupled to the host bus 24 and also to a main memory array 32, where the memory array 32 preferably comprises dynamic random access memory (DRAM). Memory mapper logic 34 is coupled to the host bus 24, the memory controller 30 and the memory array 32, and provides memory mapping functions to facilitate memory accesses to the memory array 32.

The computer system C includes an expansion bus 42, where the expansion bus 42 is preferably the Extended Industry Standard Architecture (EISA) bus, although other types of expansion buses are contemplated. A corresponding EISA bus controller (EBC) 40 is coupled between the host bus 24 and the EISA bus 42. The EBC 40 provides various bus cycle translation and conversion functions to facilitate transfers between the host bus 24 and the EISA bus 42. A system data buffer (SDB) 44 is coupled to the host bus 24, the EISA bus 42 and the memory array 32. The SDB 44 functions to buffer and transfer data between the host bus 24 and the memory array 32, between the host bus 24 and the EISA bus 42 and between the EISA bus 42 and the memory array 32. A logic block referred to as the central system peripheral (CSP) 46 is coupled to the host bus 24, the EISA bus 42 and is also coupled to a keyboard controller 62. The CSP 46 is preferably coupled through a MUX bus 50 to a logic block referred to as the distributed system peripheral (DSP) 88a in the CPU 20, and also to a similar DSP 88b located in the CPU 22. The MUX bus 50 comprises a plurality of lines for transferring signals between the CSP 46 and the DSPs 88a and 88b. The remaining details of the MUX bus 50 will not be described. For more information on the operation of the MUX bus, please see related copending application Ser. No. 07/955,482, entitled MULTI- PLEXED COMMUNICATION PROTOCOL BETWEEN CENTRAL AND DISTRIBUTED PERIPHERALS IN MULTIPROCESSOR COMPUTER SYSTEMS, filed concurrently with this application, which is hereby incorporated by reference.

Although shown connected to the host bus 24, the CSP 46 is primarily interfaced to the EISA bus 42 as was the ESP in prior systems. As will be described more fully below, the CSP 46 monitors several signals of the computer system C and broadcasts the assertion of these signals to the DSPs 88a and 88b on the MUX bus 50, where the DSPs latch these signals into corresponding local registers. The CPUs 20 and 22 and other system devices access functions within the CSP 46 and registers in the other DSP 88a or 88b by executing cycles to the EISA bus 42.

The EISA bus 42 includes a plurality of EISA slots 52 and 54 for receiving EISA interchangeable expansion cards, such as network interface or hard disk interface cards for example. The EISA bus 42 is coupled through buffers 56 to a bus referred to as the X bus 60. A number of peripheral devices are coupled to the X bus 60 including the keyboard controller 62, a real time clock (RTC) 64, an electrically erasable programmable read only memory (EEPROM) 66, a floppy disk controller 68 and a peripheral controller chip 70 which includes numerous ports and UARTS (universally asynchronous receiver/transmitters).

Figure 2:
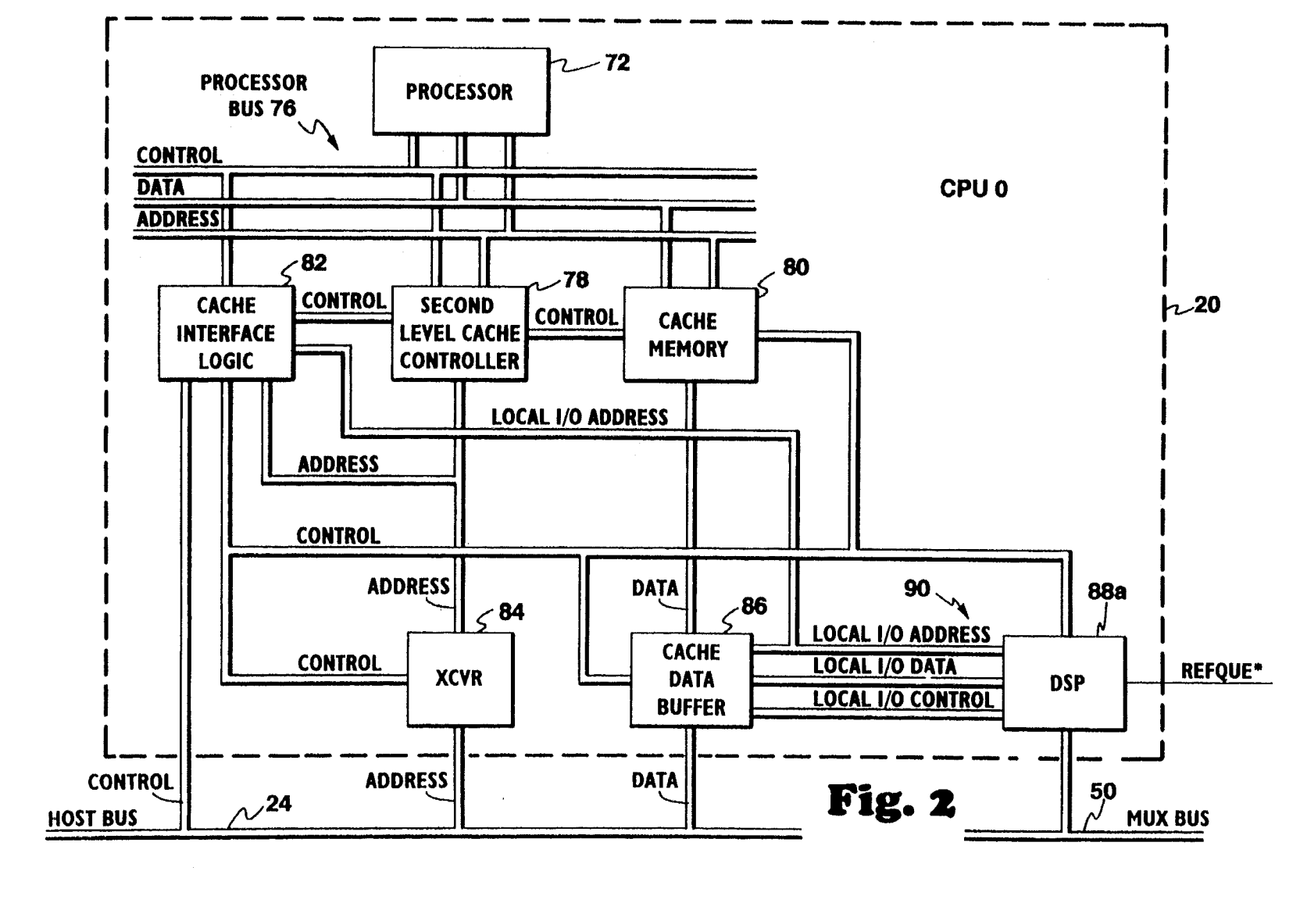
FIG. 2 is a simplified block diagram illustrating a CPU board of FIG. 1.

Referring now to FIG. 2, a block diagram of the CPU 20 is shown. The CPU 20 and the CPU 22 preferably operate in a very similar manner, except that only the CPU 20 generates a memory refresh in the preferred embodiment since it is preferably assigned to logical CPU0. The CPU 20 will now be described, it being understood that the following description applies to the CPU 22. The CPU 20 includes a processor 72 which is preferably the i486 processor by Intel, although other types of processors are contemplated for use with the present invention. The processor 72 is coupled to a processor bus 76, which includes control, data and address portions as shown.

A second level cache controller 78, which is preferably the C5 or 82495 cache controller produced by Intel, is coupled to the address and control portions of the processor bus 76. Cache memory 80, preferably comprising C8 or 82490 RAMs also by Intel, which are normally used with Intel's C5 cache controller, is coupled to the address and data portions of the processor bus 76. The cache controller 78 connects to the cache memory 80 via various control lines as shown. The C5, a second level cache controller specifically designed for the i486 processor, works in conjunction with C8 RAMs to provide a unified writeback and instruction cache which is transparent to system software. Although this configuration is used in the preferred embodiment, other configurations may also be used.

Cache interface logic 82 is coupled to the cache controller 78 through control lines and is coupled to the control portion of the processor bus 76, as shown. The address pins of the cache controller 78 are connected to a transceiver 84 which, in turn, is connected to the host bus 24. The address pins of the cache controller 78 are also connected to the cache interface logic 82. The address lines coupled between the cache controller 78 and the transceiver 84 are bi-directional, meaning that the cache controller 78 can drive an address through the transceiver 84 onto the host bus 24, and can also receive an address from the host bus 24 through the transceiver 84. The data pins of the cache memory 80 are connected to a cache data buffer 86 which, in turn, is connected to the host bus 24. The cache data buffer 86 is connected to the DSP 88a via a local I/O bus 90 comprising local I/O address, data and control lines, as shown. The cache interface logic 82 provides a portion of a local I/O address to the local I/O address lines coupled between the cache data buffer 86 and the DSP 88a.

The cache interface logic 82 is connected to the host bus 24, the address transceiver 84, the cache data buffer 86 and the DSP 88a via control lines, as shown. The control lines from the cache interface logic 82 to the address transceiver 84 and the cache data buffer 86 act as output enables for both the cache controller 78 and the cache memory 80. The control lines between the cache interface logic 82 and the DSP 88a preferably include a signal MYCYC*, which will be described more fully below. An asterisk at the end of a signal name indicates negative logic where the signal is true when asserted low. The cache memory 80 also provides control lines to the DSP 88a. The cache interface logic 82 provides the required bus controller functions to interface the second level cache system comprising the cache controller 78 and cache memory 80 with the host bus 24, and also provides necessary signal interpretation and translation functions between the cache controller 78 and the host bus 24.

Figure 3:
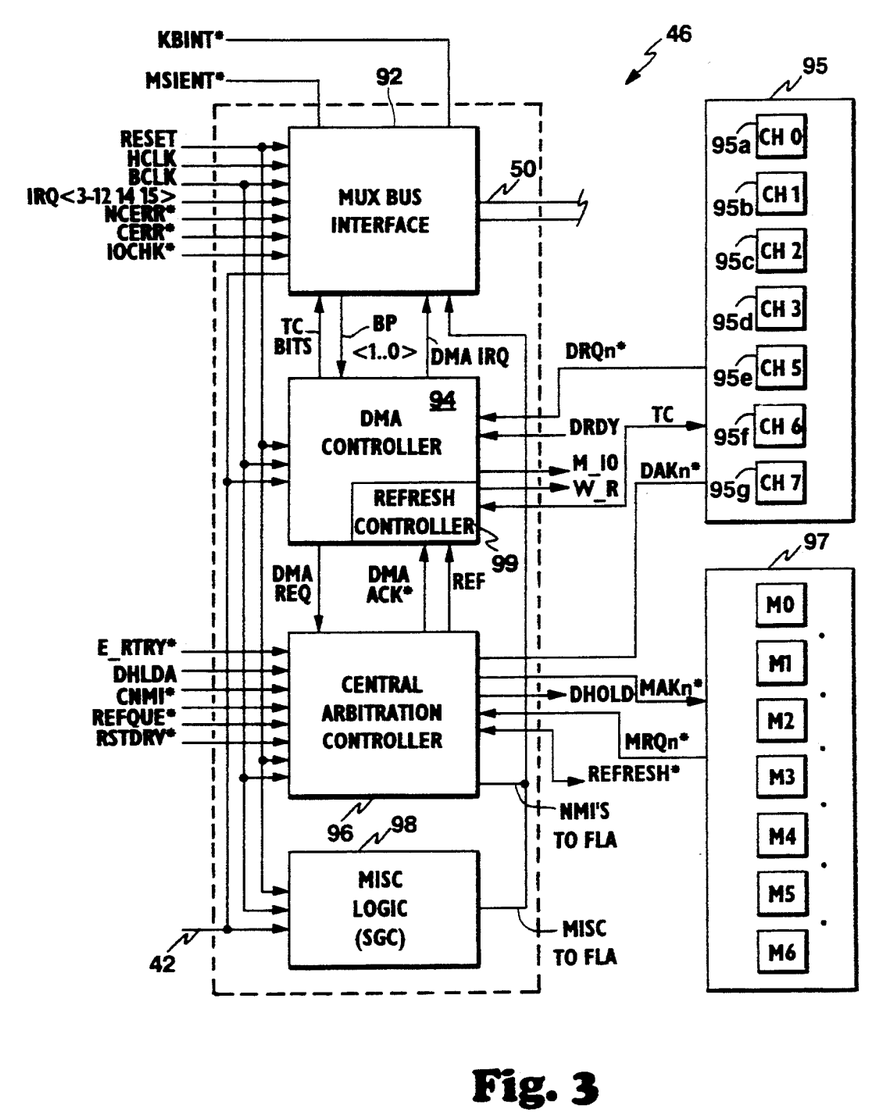
FIG. 3 is a simplified block diagram of a central system peripheral of FIG. 1.

Referring now to FIG. 3, a simplified block diagram of the CSP 46 is shown. The CSP 46 includes various system functions including a MUX bus interface 92 coupled to the MUX bus 50, a direct memory access (DMA) controller 94, a refresh controller 99, an EISA or central arbitration controller (CAC) 96 and other miscellaneous system board logic functions, which will generally be referred to as the SGC 98.

The MUX bus interface 92 receives various interrupt request signals IRQ3—IRQ12, IRQ14 and IRQ15 from the various peripheral and I/O devices. The MUX bus interface 92 then transmits corresponding interrupt request signals to the DSPs 88a and 88b via the MUX bus 50. The CSP 46 also receives two interrupt signals from the keyboard controller 62, these being a keyboard interrupt signal KBINT* and a mouse interrupt signal MSEINT*. When the KBINT* signal is asserted, the CSP 46 generates an interrupt request signal referred to as IRQ1 that is provided over the MUX bus 50 to the DSP. The CSP 46 combines the interrupt request signal IRQ12 with the MSEINT* signal through an AND gate (not shown) before providing a corresponding IRQ12 signal to the MUX bus 50. A signal CERR* is asserted by the SDB 44 indicating a correctable memory error which is sent to the DSPs 88a and 88b via the MUX bus 50 and combined with other interrupt signals to form a shared interrupt IRQ13. One interrupt signal sharing the IRQ13 interrupt is a signal DMAIRQ provided by the DMA controller 94 to the MUX bus interface 92 and transferred via the MUX bus 50. The DMAIRQ signal is described more fully below.

Refresh cycles are initiated by the assertion of a signal REFQUE*, which is provided by the DSP 88a which is assigned as DSP0 within the logical CPU0. The CAC 96 includes an internal refresh queue which is incremented every time the DSP 88a asserts the REFQUE* signal low. This refresh queue within the CAC 96 keeps track and queues up all the refresh requests until such time is the refresh controller 99 is given access to the host bus 24 and runs a refresh cycle. The CSP 46 can handle up to 4 pending refresh cycles, so that if more than 4 refresh cycles are pending, the counter is not incremented past 4 and a refresh queue overflow signal, referred to as REFQOVR, is asserted by the CSP 46 and transferred to the DSP 88a through the MUX bus 50. This REFQOVR overflow signal is handled as a nonmaskable interrupt (NMI) in the DSPs 88a and 88b. It is noted that the term "nonmaskable" typically concerned interrupts which do not have a mask register or other means of disablement. As will be seen, the NMI interrupts can be enabled or disabled in the preferred embodiment to allow full flexibility.

The CSP 46 also preferably latches the assertion of each of four other possible system NMI interrupt conditions on the system board of the computer system C, and transfers the five NMI interrupts to the DSPs 88a and 88b via the MUX bus 50. These five NMI transfers include the REFQOVR signal which is asserted if the refresh queue counter in the CAC 96 has overflowed, an EISA bus master timeout referred to as EBMTIM, which is asserted if a 32 microsecond ($\mu$S) EISA timeout in the CAC 96 has occurred when an EISA bus master retains the EISA bus 42 for at least 32 $\mu$S, an expansion bus cycle timeout referred to as BUSTIM, which is asserted if either the EBMTIM timeout occurs or a 32 $\mu$S timeout of a timer monitoring a CMD* signal occurs, a non-correctable memory error indicated by a signal NCERR* which is asserted by the SDB 44 and a signal IOCHK* from the ISA portion of the EISA bus 42 used to indicate parity errors on memory cards plugged into the ISA bus. A timer in the CSP 46 monitors the CMD* signal residing on the EISA bus 42 so that if the CMD* signal remains asserted for more than 32 $\mu$S, which corresponds to approximately 256 BCLK periods, the timer times out and the BUSTIM interrupt is generated.

There are a few other miscellaneous transfers which are required to inform the DSPs 88a and 88b of the occurrence of several miscellaneous events within the CSP 46. Both the assertion and deassertion of these events is transferred on the MUX bus 50. Upon power up, the computer C automatically determines which CPUs are installed in available physical CPU slots and assigns logical port numbers. A power up timeout signal, referred to as PUT0, is asserted if a CPU does not respond before timeout of a timer, indicating that CPU is not installed. For more information on this assignment capability, please see related copending application Ser. No. 07/955,683, entitled ARRANGEMENT OF DMA, INTERRUPT AND TIMER FUNCTIONS TO IMPLEMENT SYMMETRICAL PROCESSING IN A MULTIPROCESSOR COMPUTER SYSTEM, filed concurrently with this application, which is hereby incorporated by reference. Two other miscellaneous signals are provided on the MUX bus 50. The CSP 46 incorporates most of the logic previously located in a logic block referred to as SGC which was separate from the ESP in prior systems. The SGC 98 in the CSP 46 includes the CPU restart logic and force A20 logic and asserts corresponding RSTAR and LOWA20 signals. These signals are the same or similar in prior systems and will not be described further. Any changes in these signals is transferred on the MUX bus 50.

The DMA controller 94 and the CAC 96 are coupled to a plurality of DMA devices 95, individually referred to as 95a–95g, corresponding to seven channels 0–3 and 5–7 of the DMA controller 94. The DMA controller 94 is designed to be compatible with the two 8237A DMA controllers which were used in the ESP so that the seven channels of the DMA controller 94 are logically grouped into a four channel DMA controller comprising channels 0–3, referred to as DMA1, and a three channel DMA controller comprising the channels 5–7, referred to as DMA2. Channel 4 is not a DMA channel per se but functionally provides the cascading of the DMA requests from channels 0–3 as was done in the ESP. All major functions of the 8237A DMA controllers are incorporated into the design of the DMA controller 94, although a few enhancements and features have been added to provide more capabilities for the EISA architecture.

Each of the DMA devices 95a–95g assert a terminal count (TC) signal or bit indicating that terminal count has been reached for that channel. The TC bits are provided to the DMA controller 94, and the DMA controller 94 provides the TC bits to the MUX bus interface 92. Any time a TC bit is asserted, all of the TC bits are transferred to the DSPs 88a and 88b on the MUX bus 50. In this manner, the TC bits are maintained in the DSPs 88a and 88b.

As in prior systems, the seven DMA devices 95a–95g each provide a corresponding request signal DRQn* to the DMA controller 94 to gain control of the EISA bus 42, and receives a corresponding acknowledge signal DAKn* from the CAC 96 which informs the respective DMA device 95a–95g that it may assume control of the EISA bus 42. The letter "n" is an integer between 0 and 7 inclusive identifying each of the seven respective DMA channels or DMA devices 95a–95g. The DMA controller 94 requests the EISA bus 42 for the respective DMA devices 95 through a signal DMAREQ to the CAC 96 and receives a corresponding acknowledge signal DMAACK* which informs the DMA controller 94 that the highest priority DMA device 95 has gained control of the EISA bus 42.

The DMA controller 94 provides 32 bits of memory address and 24 bits of byte count for each of the 7 channels, and includes corresponding registers. The DMA controller 94 supports 8, 16 or 32-bit DMA transfers. A base/current address register in the DMA controller 94 is 16 bits and contains the two lowest bytes of the memory address. A base/current count register in the DMA controller 94 is also 16 bits and contains the two lowest bytes of the byte count. There are two high page registers for the two remaining address bytes and a high count register for the high byte of the count for each DMA channel. Both DMA controllers DMA1 and DMA2 for the respective channels 0–3 and 5–7, each include a status register, a clear byte pointer flip flop register and a master clear register. The lower four bits of the status register comprises the TC bits for the respective channels and the upper four bits comprise corresponding request bits. The request bits are set when a corresponding DRQn, is asserted by one of the DMA devices 95a–95g. The registers are summarized in the following Table I:

TABLE I

| DMA CONTROLLER 94 REGISTERS | | |
|---|---|---|
| Hex Port Address | Register Type | Register Name |
| 0000 | rw | DMA1 CH-0 Base/Current Address |
| 0001 | rw | DMA1 CH-0 Base/Current Count |
| 0002 | rw | DMA1 CH-1 Base/Current Address |
| 0003 | rw | DMA1 CH-1 Base/Current Count |

TABLE I-continued
DMA CONTROLLER 94 REGISTERS

| Hex Port Address | Register Type | Register Name |
|---|---|---|
| 0004 | rw | DMA1 CH-2 Base/Current Address |
| 0005 | rw | DMA1 CH-2 Base/Current Count |
| 0006 | rw | DMA1 CH-3 Base/Current Address |
| 0007 | rw | DMA1 CH-3 Base/Current Count |
| 0008 | ro | DMA1 Status Register |
| 000C | wo | DMA1 Clear Byte Pointer |
| 000D | wo | DMA1 Master clear |
| 00C0 | rw | DMA2 CH-4 Base/Current Address |
| 00C2 | rw | DMA2 CH-4 Base/Current Count |
| 00C4 | rw | DMA2 CH-5 Base/Current Address |
| 00C6 | rw | DMA2 CH-5 Base/Current Count |
| 00C8 | rw | DMA2 CH-6 Base/Current Address |
| 00CA | rw | DMA2 CH-6 Base/Current Count |
| 00CC | rw | DMA2 CH-7 Base/Current Address |
| 00CE | rw | DMA2 CH-7 Base/Current Count |
| 00D0 | ro | DMA2 Status Register |
| 00D8 | wo | DMA2 Clear Byte Pointer |
| 00DA | wo | DMA2 Master Clear | where rw, ro, and wo indicate read-write, read-only and write-only registers, respectively.

The DMA controller 94 presents an 8-bit interface and should only be programmed with 8-bit I/O instructions, so that the 16-bit base/current address and count registers of the DMA controller 94 must be accessed through two consecutive 8-bit I/O instructions to the same address. To facilitate accessing of these multiple byte registers, byte pointers are used to indicate the next byte to be accessed. Each byte pointer points to one of the bytes in its corresponding registers so that a read or write to those registers accesses the indicated byte, and the byte pointer is updated to point to the other byte. Subsequent reads and writes to the base/current registers toggle its byte pointer correspondingly.

There are five byte pointers which are used by the DMA controller 94. The first byte pointer is an EISA bus master byte pointer which is internal to the CSP 46 and is used for all channels when one of the EISA bus masters 97 is programming the CSP 46. Two byte pointer flip flops are provided in the DSP 88a and are used when the CPU 20 is programming the DMA controller 94, where one byte pointer flip flop asserts a signal XBP<0> at its output which is used for channels 0–3, and the other asserts a signal XBP<1> at its output which is used for channels 5–7. The DSP 88b also includes two analogous byte pointer flip flops for the CPU 22. As will be described more fully below, the DSPs 88a and 88b detect when their corresponding CPUs 20 and 22 are accessing the DMA1 channel 0–3 registers and the DMA2 channel 4–7 registers, and asserts and toggles the XBP<1 . . . 0> signals on the MUX bus 50 accordingly. The MUX bus interface 92 receives the XBP<1 . . . 0> signals from the MUX bus 50 and provides corresponding signals BP<1 . . . 0> to the DMA controller 94.

The two byte pointers for each CPU allows compatibility with the operation of the byte pointers in the ESP in which there were two separate pointers for the two separate DMA1 and DMA2 controllers. Independent byte pointers for each CPU or EISA bus masters prevent problems from occurring if an EISA or ISA bus master or another CPU interrupts a first CPU's DMA programming sequence of one DMA channel of the DMA1 or DMA2 controller, with its own DMA programming sequence of a different channel of the same DMA1 or DMA2 controller. Of course, the system programmer must ensure the two devices are not programming the same DMA channel.

The buffer chaining capability was provided in the ESP and is supported by the DMA controller 94, which allows the capability to alter the base registers of each channel during the course of the present DMA program so that when TC occurs, the contents of the current registers could be loaded with new information from base registers. In this manner, one of the CPUs 20 and 22 can alter the base registers during the present DMA program without altering the current registers during programming. This mode is useful for transferring information from several noncontiguous buffers between an I/O device and memory. After winning the EISA bus 42, the DMA controller 94 runs cycles transferring data from the first buffer. After the first buffer expires, the current registers are reloaded with the contents of the base registers, a chaining program bit is reset, and an interrupt signal is sent to the programming master indicating that the current buffer is done and that the next buffer is starting. The interrupt signal is the DMAIRQ signal if the programming master is one of the CPUs 20 and 22. The DMAIRQ signal is provided to the MUX bus interface 92 and to the DSPs 88a and 88b, and then combined to generate the IRQ13 interrupt.

The CAC 96 is coupled to a plurality of EISA bus masters 97 through a plurality of request signals MRQn* and a plurality of corresponding acknowledge signals MAKn*. The letter "n" is an integer identifying individual EISA bus masters 97. The CSP 46 receives two clock signals referred to as BCLK and HCLK where the BCLK signal is used as its main clock reference. The HCLK signal is used by the MUX bus interface 92 to synchronize data transfers to the DSPs 88a and 88b, and is also used by the refresh queue logic provided in the CAC 96, described above.

The CAC 96 provides the capability in the EISA architecture for several slave DMA and bus master controllers to share and control the EISA bus 42 and operates in a similar manner as the ESP. The devices that can control the EISA bus 42 are the CPUs 20 and 22, 16 and 32-bit EISA bus masters 97, the DMA devices 95, 16-bit ISA bus masters and their refresh controllers (not shown) through the DMA controller 94 and the refresh controller 99. The DMA controller 94 requests access to the EISA bus 42 through the DMAREQ signal if there are any unmasked DMA requests from the EISA bus 42. If the DMA controller 94 is the winner of the EISA bus 42, the CAC 96 asserts the DMAACK* low to the DMA controller 94 and also performs arbitration among the individual DMA requests to determine which DMA channel and DMA device 95 wins the EISA bus 42 and asserts the corresponding DAKn* signal. The refresh controller 99 is granted control of the EISA bus 42 when the CAC 96 asserts a signal REF to the refresh controller 99. A signal REFRESH* is also asserted by the CAC 96 when the refresh controller 99 has control. The REFRESH* signal is a bi-directional signal which can also be pulled low by a 16-bit bus master which runs a refresh cycle.

An EISA bus master requests access by activating one of the slot specific MRQn* lines and if the CAC 96 awards priority to that master, it asserts a corresponding MAKn* signal. The CPUs 20 and 22 request access to the EISA bus 42 via a signal referred to as E_RTRY*. If a CPU wins control of the EISA bus 42, the CAC 96 acknowledges the CPU's ownership by negating a signal DHOLD to the EBC 40, whereas the EBC 40 acknowledges receipt of the negated DHOLD signal by negating a signal referred to DHLDA. One of the CPUs 20 and 22 which is the owner of the EISA bus 42 can own that bus for as long as there are no other requests for the EISA bus 42. When another request for the EISA bus 42 is received, the DHOLD signal is immediately asserted high by the CAC 96 and the EISA bus 42 is rearbitrated when the DHLDA signal is returned active by the EBC 40 to return control to the CAC 96.

Figure 4:
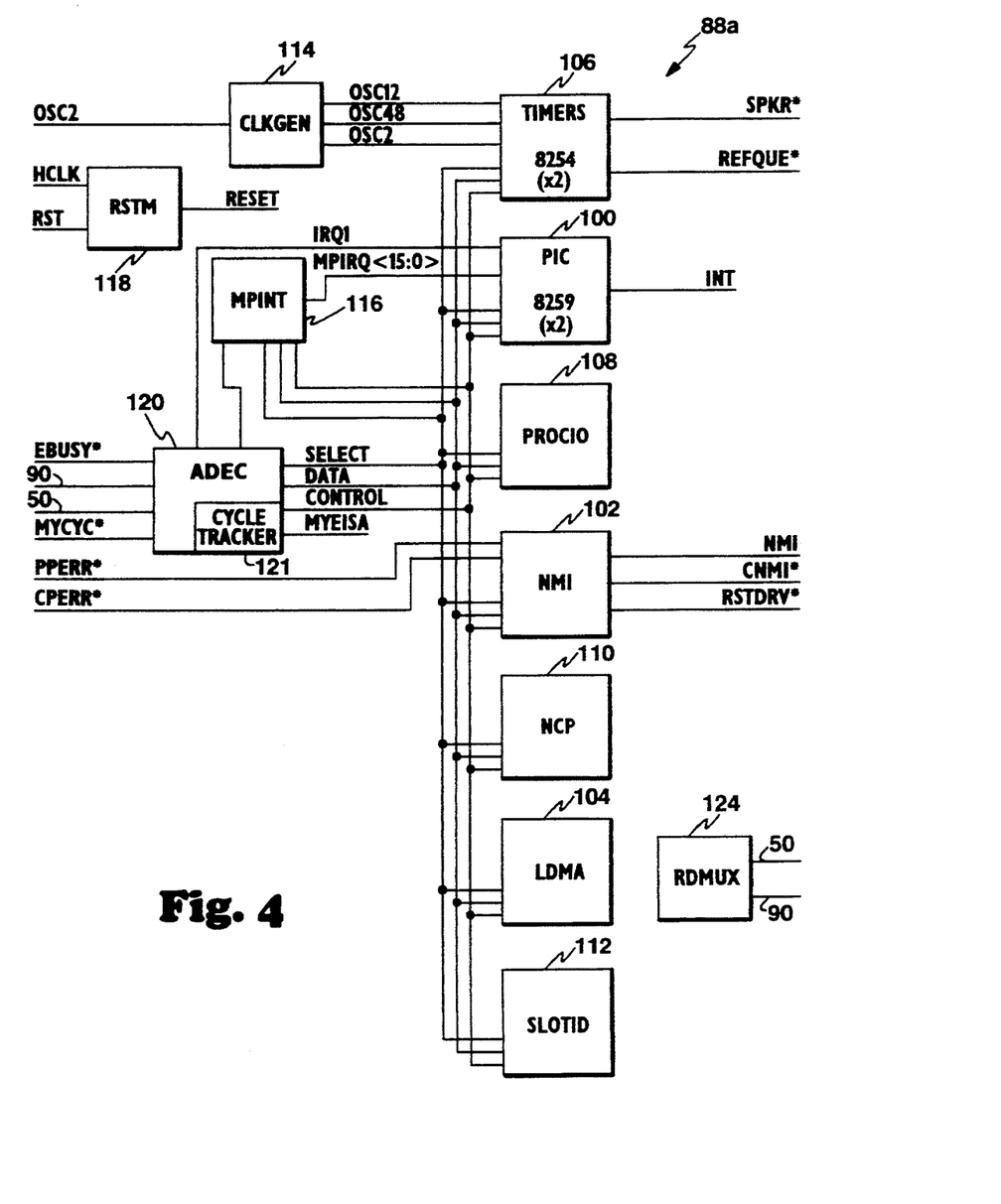
FIG. 4 is a simplified block diagram of a distributed system peripheral (DSP) of FIG. 1.

Referring now to FIG. 4, the DSP 88a is shown which implements various logic functions that are closely related to the processor 72 and its cache subsystem of the CPU 20. These functions are also provided to the CPU 22 through the DSP 88b, which were previously implemented only in the ESP and only available to the CPU0. Only the DSP 88a is described, it being understood that the DSP 88b and other DSPs, if installed, function the same unless otherwise stated. The DSP 88a includes a programmable interrupt controller (PIC) 100, NMI logic 102, local DMA logic (LDMA) 104, timers 106, processor I/O logic (PROCIO) 108 which includes various CPU control and status registers related to DMA functions, numeric coprocessor logic (NCP) 110, processor identification logic (SLOTID) 112, timer clock generation logic (CLKGEN) 114, multiprocessor interrupt sharing logic (MPINT) 116, synchronous reset logic (RSTM) 118, dual port I/O interface logic (ADEC) 120 and a data output multiplexor (RDMUX) 124.

The ADEC 120 interfaces the various registers in the DSP 88a with the local I/O bus 90 and the MUX bus 50. The ADEC 120 is coupled to the local I/O bus 90 and the MUX bus 50 and provides decode and control logic to allow accesses to the registers within the DSP 88a. The ADEC 120 controls the RDMUX 124 which preferably multiplexes all of the DSP 88a data I/O sources into one data bus which is then output to both the local I/O bus 90 and the MUX bus 50. The ADEC 120 is connected to several of the logic blocks including the timers 106, the PIC 100, the PROCIO 108, the NMI logic 102 the NCP 110, the LDMA 104, the MPINT 116 and the SLOTID 112 through select, data and control lines as shown in FIG. 4, where the various registers are located in each one of these logic blocks. A cycle tracker 121 is preferably part of the ADEC 120 and is used to determine when cycles on the MUX bus 50 are initiated by the CPU 20, as will be described more fully below.

The ADEC 120 in the DSP 88a decodes an address provided on the local I/O bus 90 or the MUX bus 50 and provides a chip select to one of the functional blocks including the timers 106, the PIC 100, the PROCIO 108, the NMI logic 102, the NCP 110, the LDMA 104, the SLOTID 112 and the MPINT 116, where the selected functional block contains the particular I/O register being read from or written to. The PROCIO logic 108 includes the control and status registers of the CPU 20 and is accessed via the MUX bus 50 so that the CPU 22 can write to or read from the control and status registers of the CPU 20, and vice versa. The CPU 20 can access its own control and status registers locally through the PROCIO 108 and the local bus 90. The SLOTID 112 contains the logic necessary to program and identify the logical CPU and DSP subsystem. Included in this logic is a power-up fault tolerance feature that allows any CPU subsystem to be assigned to logical CPU0, regardless of the physical CPU slot in which it has been installed. Therefore, although the CPU 20 is assigned the logical CPU0 and the DSP 88a is assigned the logical DSP0, the CPU 20 and the DSP 88a could be assigned to CPU1 and DSP1, respectively, if desired. The NCP logic 110 provides the logic to handle coprocessor errors. The MPINT 116 provides interrupt request outputs MPIRQ<15 . . . 0> to the PIC 100 and allows a CPU to interrupt other CPUs at an interrupt level in one I/O access. The MPINT 116 provides an efficient multiprocessor communication capability, and will be described further below. The RSTM 118 logic synchronizes the DSP 88a to the rest of the subsystems of the CPU 20.

Many of the registers discussed above and below are local so that each of the DSPs 88a and 88b have their own independent ports or registers located at the same system address. For example, an NMI status register, described below, is preferably located at the same address 0061h for both DSPs 88a and 88b. An "h" at the end of an address indicates hexadecimal notation. The local I/O bus 90 allows the CPU 20 to access its local registers without encountering the overhead of the host bus 24 or the EISA bus 42. The local I/O function is partitioned between the cache interface logic 82, the cache data buffer 86 and the DSP 88a, where the cache interface logic 82 contains the address decode and address encode to determine when a cycle initiated by the processor 72 is to be executed on the local I/O bus 90, and thus contained within the DSP 88a. The cache data buffer 86 provides the local I/O bus 90 data latches for assembly and disassembly between a 32-bit processor data bus 76 and the 8-bit local I/O data bus 90 and also contains the controller of the local I/O bus 90 which provides control for data latches and the local I/O registers for the DSP 88a.

The MUX bus 50 allows the CPU 20 and other system devices to access the local registers of the CPU 22 and vice versa. The cache interface logic 82 detects a system address from the processor 72 that corresponds to local registers in the DSP 88a, and executes the cycle on the local I/O bus 90 and retrieves the contents of the local register. Since the system addresses of many of the registers are the same in all DSPs, including the DSPs 88a and 88b, the CPU 20 would otherwise be prevented from accessing the local registers of another CPU, such as the CPU 22. A series of index registers are provided to allow indirect addressing capability. The index registers preferably comprise four registers: an index CPU register preferably located at 0C74h, an index address low register preferably located at 0C75h, an index address high register preferably located at 0C76h, and an index data register preferably located at 0C77h. The index address high and low registers are collectively referred to as the index address registers. The CPU 20 executes a cycle to the CSP 46 through the EISA bus 42 as controlled by the EBC 40. The CSP 46 decodes the address and executes a data read or write cycle on the MUX bus 50 to one or both DSPs 88a and 88b. For index writes, the access can be accomplished in one doubleword access with the selected CPU data written to the index CPU register, the system address written to the index address registers, and the data written to the index data port. For indexed reads, the index CPU register and system address is written first, and the next read of the index data register provides the data. The index CPU register preferably resides in each DSP 88a and 88b and the remaining index ports reside in the CSP 46.

In the prior asynchronous architectures, the interval timer modules were centralized and resided in the ESP. In the preferred embodiment of the present invention, the DSP 88a implements a processor local interval timer architecture in which every processor, such as the processor 72, has its own set of interval timers which are accessible through the local I/O bus 90. The purpose of a programmable interval timer is to generate pulses at software controllable intervals. In the preferred embodiment, the timers 106 comprises two 8254 compatible interval timers for a total of six counter timers. The clock inputs for the counters within the timers 106 are provided by the CLKGEN 114, which receives a clock signal OSC2 from the EISA bus 42 which is approximately 7.16 MHz. The OSC2 signal is synchronized with the HCLK signal by the CLKGEN 114 to provide a 7.16 MHz clock signal referred to as OSC2'. The synchronous OSC2' signal is then divided appropriately to create a 1.193 MHz signal referred to as OSC12 and a 298.3 KHz clock signal referred to as OSC48 The OSC2', OSC12 and OSC48 signals are provided to the timers 106.

Interval timer 1, counter 0 within the timers 106 provides an IRQ0 signal to the PIC 100 and provides a system timer interrupt for a time-of-day, diskette timeout, and other system timing functions. Interval timer 1, counter 1 within the timers 106 generates the REFQUE* signal which is only active in the CPU0 as determined by the SLOTID 112. An interval timer 1, counter 2 generates the tone for a speaker of the computer system C. An interval timer 2, counter 0 is referred to as the "fail-safe timer" which can generate NMI interrupts at regular intervals. This NMI interrupt is referred to as FAILTIM and is used by operating system to prevent the system from locking up. Interval timer 2, counter 1 is preferably not implemented and an interval timer 2, counter 2 is preferably used to slow down logical CPU0 by means of pulse width modulation.

The PIC 100 preferably comprises two cascaded 8-bit interrupt controllers INT-1 and INT-2, each similar to the Intel 8259, to provide 15 levels of interrupts similar to that in the ESP. The INT-1 has inputs IRQ0-IRQ7 and receives the corresponding IRQ0-IRQ7 described above, where IRQ2 is the cascaded interrupt IRQ2 from INT-2. INT-2 has inputs IRQ8-IRQ15 and also receives the corresponding IRQ8-IRQ15 interrupt signals. The CSP 46 provides the interrupts IRQ1, IRQ3-12 and IRQ14 and IRQ15, as described previously, across the MUX bus 50 to the ADEC 120, which then provides these interrupts to the PIC 100. The IRQ0 signal is provided by the timers 106 as described above. The IRQ13 interrupt is shared with the DMAIRQ interrupt, the correctable memory error as indicated by the assertion of the CERR* signal, the assertion of a coprocessor error and several CPU IRQ13 programmable interrupts.

Three registers are provided within each DSP 88a and 88b for each of the interrupt controllers INT-1 and INT-2, which are the control, mask and edge/level control registers as was done in the ESP. Also, an interrupt acknowledge register, referred to as the INTA register, is accessible by the local CPU by an interrupt acknowledge cycle through the local I/O bus 90. The PIC 100 asserts a signal INT to the CPU 20 if any of these interrupts occur and are not masked. Since the PIC 100 is implemented within each CPU 20 and 22 in a similar and compatible manner as the PIC in the ESP, system interrupt handling is very similar except accomplished locally within each CPU 20 and 22 rather than through the EISA bus 42. Further, a programmer may enable any of the interrupts for a CPU and mask off the remaining interrupts. The system programmer may thus assign any interrupts to any CPU, providing symmetric system interrupt handling access.

In previous systems using the ESP, NMI related logic was located centrally and the NMI interrupts are serviced only by the CPU0. To support symmetrical processor architecture, the DSP 88a implements the NMI logic 102 locally and allows each NMI interrupt to be enabled or disabled, thus allowing NMI interrupts to be assigned to a specific CPU as is done for system interrupts. The NMI logic 102 of the DSP 88a generates an NMI interrupt through a signal referred to as NMI to the processor 72 for several conditions, provided that the particular interrupt input for that condition is enabled. The NMI logic 102 is used to notify the local processor 72 of conditions in the system that need immediate attention before the processor 72 may proceed with its current task. As previously discussed, the expansion bus error indicated by the IOCHK* signal, the EISA bus master timeout BUSTIM, and the expansion bus cycle timeout EBMTIM, the refresh overflow error indicated by the REFQOVR signal and the non-correctable memory error indicated by the NCERR* signal are transferred from the CSP 46 to the DSP 88a via the MUX bus 50. Several other nonmaskable interrupts are generated within the DSP 88a including the failsafe timer timeout FAILTIM, a software NMI I/O port interrupt referred to as NMIPORT, a processor parity error indicated by the assertion of a signal PPERR* and a cache parity error indicated by the assertion of a signal CPERR*.

Several registers or ports are provided to enable and disable the NMI interrupts and functions individually, locally and globally. A global NMI enable port is provided to enable or disable all of the NMI interrupts for the entire computer system C. An extended NMI port preferably includes a bit to enable or disable all NMI interrupts for the local CPU 20 and 22, respectively. Three other bits of the extended NMI port are provided to enable and reset the processor parity error NMI interrupt, the cache parity error NMI interrupt, and the refresh queue overflow interrupt. Correspondingly, three other bits of the extended NMI port are provided to detect the assertion of the PPERR*, CPERR* and REFQOVR signals as long as these interrupts have been reset and are enabled locally and globally. Four bits of the NMI status register allow detection and resetting of the interrupts associated with the IOCHK* and NCERR* signals. A write by software to a software I/O NMI interrupt register immediately causes the NMIPORT NMI interrupt. Another port, referred to as the extended NMI and reset control port, allows detection and resetting of the FAILTIM, the BUSTIM, the EBMTIM, and the NMIPORT interrupts. Table 2 summarizes the NMI registers:

TABLE 2

| NMI REGISTERS | | |
|---|---|---|
| Hex Address (h) | Register Type | Register Name |
| 0061 | rw | NMI Status |

TABLE 2-continued
NMI REGISTERS

| Hex Address (h) | Register Type | Register Name |
|---|---|---|
| 0461 | rw | Extended NMI and Reset Control |
| 0462 | wo | Software I/O NMI interrupt |
| 0C6E | rw | Extended NMI |
| 0070 | rw | Global NMI enable |

To illustrate a few examples, the DSP 88a receives the IOCHK* signal from the CSP 46 through the MUX bus 50. If the IOCHK* signal is asserted, bit 6 of the NMI status port is set if enabled by bit 3. If global NMI is enabled by the global NMI enable port, and if local NMI for the DSP 88a is enabled by the extended NMI port, the NMI signal to the processor 72 is asserted low until bit 6 of the NMI status register is reset or until the expansion bus error interrupt is disabled locally or globally. To reset the bit 6 of the NMI status port, bit 3 is pulsed high. A timeout of the internal timer 2, counter 0 in the DSP 88a generates the FAILTIM interrupt, where bit 7 of the extended NMI and reset control port is set if bit 2 is set and NMI interrupts are enabled locally and globally. The NMI signal is asserted until bit 7 of the extended NMI and reset control port is reset or until NMI interrupts are disabled locally or globally. The remaining NMI interrupts function in a similar manner, thus allowing a system programmer to enable or disable all or selected ones of the NMI interrupts for each of the CPUs 20 and 22.

The enable and status registers for the NMI interrupts were not provided in the ESP since only one processor handled them all. In a symmetric computer system according to the present invention, a system programmer is responsible to assign certain NMI interrupts to certain CPUs since both CPUs 20 and 22 should not respond to the same NMI interrupt. The NMI registers allow all or selected ones of the NMI interrupts to be enabled for each CPU.

The EISA bus 42 may be reset without resetting other devices in the computer system C by setting bit 0 of the extended NMI and reset control register. When set, an RSTDRV* signal is asserted by the NMI logic 102 until bit 0 is reset. The RSTDRV* signal is provided to the CAC 96 which resets the EISA bus 42. Bit 0 should preferably be set for a short time and then reset. The RSTDRV* signal is also asserted when a BUSTIM interrupt occurs and is cleared when the BUSTIM interrupt is cleared. The RSTDRV* signal is shared by the DSPs 88a and 88b on the host bus 24. A combined NMI signal, referred to as CNMI*, resides on the host bus 24 and is asserted by either the DSP 88a or the DSP 88b when an unmasked and enabled NMI interrupt occurs. This signal is shared by the DSPs 88a and 88b and is provided to the CAC 96 and is pulled up or high when inactive.

The LDMA 104 includes the local byte pointer flip-flops and the local DMA status registers as previously described. The CPU 20 runs a cycle to the EISA bus 42 to program and access the DMA controller 94, such as to read to and write from the DMA registers. The CSP 46 detects any cycle on the EISA bus 42 to a register located in a DSP as indicated by a system address, and executes a data cycle on the MUX bus 50 to access the appropriate registers. The cycle tracker 121 within the ADEC 120 detects a cycle on the MUX bus 50 initiated by the processor 72 to the EISA bus 42 as indicated by the MYCYC* signal from the cache interface logic 82, and a signal EBUSY* asserted by the EBC 40. The cache interface logic 82 asserts the MYCYC* signal when a cycle executing on the host bus 24 is destined for the EISA bus 42 through the EBC 40. The EBC 40 asserts the EBUSY* signal when the cycle starts on the EISA bus 42, and keeps it asserted to the end of the EISA cycle. The cycle tracker 121 receives the MYCYC* and EBUSY* signals and generates a signal MYEISA, which indicates when the cycle initiated by the CPU 20 is executing on the EISA bus 42.

In this manner, only one of the DSPs 88a and 88b detecting a cycle to its DMA registers and detecting its internal MYEISA signal asserted responds to the cycle on the MUX bus 50. This provides a means for selecting the appropriate CPU 20 and 22 and its corresponding DSP 88a and 88b. When a CPU accesses the EISA bus 42, as determined by the corresponding cycle tracker provided with each of the DSPs 88a and 88b, the appropriate byte pointer flip flop output signals XBP<1 . . . 0> are driven onto the MUX bus 50 by the selected DSP, and the byte pointer bits are toggled. The respective byte pointers are cleared so that they point to the least significant byte of the respective register when a hardware reset occurs, a master clear command is sent to the respective DMA controller by writing to the DMA1 or DMA2 master clear ports, or a clear byte pointer command is sent by writing to the respective DMA1 or DMA2 clear byte pointer flip flop register.

The cycle tracker 121 indicates when one of the DMA status registers is being accessed by its corresponding CPU 20 or 22. The CSP 46 detects a read to the status register and runs a cycle in the MUX bus 50 to retrieve the respective TC bits from the DSP 88a. The DSP 88a detects the cycle on the MUX bus 50, receives the MYEISA signal from the cycle tracker 121 and provides the corresponding TC bits on the MUX bus 50. The TC bits in the DSP 88a are also cleared when the corresponding register is read or when a hardware reset occurs.

The MPINT 116 allows CPU programmable interrupts and other interrupt sources to be shared at any interrupt level, thus allowing for greater software flexibility in a multiprocessor environment. Each programmable CPU interrupt can be individually enabled, disabled, set or cleared in any interrupt level through multiprocessor (MP) interrupt control/status ports. The MP interrupt ports are generally referred to as control ports when written to and status ports when read. Each level of interrupt, generally represented by the letter x, is an integer from 0–15, excluding level 2, where each interrupt level has its own MP interrupt port. The status for each of the interrupt levels x can be obtained by reading the corresponding MP interrupt status ports, which causes that corresponding interrupt level x to be automatically cleared. The processor 72 may access its own MP interrupt ports via a local bus access and may access the MP interrupt ports of other processors via the index registers.

The MP interrupts can also be set at a selected interrupt level for any combination of processors via a CPU interrupt mask port and a CPU programmable interrupt port. Since these two ports are located within the same doubleword of memory, access to these ports can and should be made through a doubleword write to the EISA address of the CPU interrupt mask register, which is preferably 0CD0h, to avoid having another CPU changing the CPU interrupt mask port before the write to the MP interrupt port is performed. The MP interrupt request outputs (MPIRQx) are ORed with the IRQx inputs within the PIC 100 after edge/level detect logic 178 (FIG. 5), thus allowing for the sharing of the programmable interrupt levels with normal system interrupts. The multiprocessor interrupt, mask and CPU programmable interrupt ports are summarized in Table III below:

TABLE III

| MULTIPROCESSOR INTERRUPT PORTS | | |
|---|---|---|
| Hex Port Address | Register Type | Register Name |
| 0CB0 | rw | MP Int0 Control/Status |
| 0CB2 | rw | MP Int1 Control/Status |
| 0CB4 | rw | MP Int3 Control/Status |
| 0CB6 | rw | MP Int4 Control/Status |
| 0CB8 | rw | MP Int5 Control/Status |
| 0CBA | rw | MP Int6 Control/Status |
| 0CBC | rw | MP Int7 Control/Status |
| 0CBE | rw | MP Int8 Control/Status |
| 0CC0 | rw | MP Int9 Control/Status |
| 0CC2 | rw | MP Int10 Control/Status |
| 0CC4 | rw | MP Int11 Control/Status |
| 0CC6 | rw | MP Int12 Control/Status |
| 0CC8 | rw | MP Int13 Control/Status |
| 0CC9 | rw | MP Int13 Control/Status Extended |
| 0CCC | rw | MP Int14 Control/Status |
| 0CCE | rw | MP Int15 Control/Status |
| 0CD0 | w | CPU Interrupt Mask |
| 0CD3 | w | Programmable CPU Interrupt |

Interrupt level 13 also includes enables and disables in the MP extended control port Int13 for interrupts caused by a numeric coprocessor error (NCPERR), the memory correctable error indicated by the CERR* signal, and the DMA chaining interrupt indicated by the DMAIRQ signal, which we combined to form the MP Int13.

Table IV below summarizes the bit-map of each of the MP interrupt control ports:

TABLE IV

| MP INTERRUPT CONTROL PORTS (WRITE) | | | |
|---|---|---|---|
| Bit | I/O | Name | Function |
| 7 | W | Reserved | Always Write 0 |
| 6 | W | Reserved | Always Write 0 |
| 5 | W | Reserved | Always Write 0 |
| 4 | W | Reserved | Always Write 0 |
| 3 | W | PINTEN<x>-CLR | PINT<x> Enable Clear |
| 2 | W | PINTEN<x>-SET | PINT<x> Enable Set |
| 1 | W | PINT<x>-CLR | CPU Prog Int <x> Clear |
| 0 | W | PINT<x>-SET | CPU Prog Int <x> Set | where PINT<x> generally represents each interrupt level and PINTEN<x> represents the enable signal for the interrupt level x. For example, when a 1 is written to bit 3 of the MP interrupt control port for interrupt level x, or the PINTEN(x)-CLR bit, the CPU programmable interrupt for the level x is disabled. Also, when a 1 is written to bit 2, or the PINTEN(x)-SET bit, the CPU programmable interrupt for the level x is enabled. If the same value (0 or 1) is written to both the set and clear bits, the state of the bit does not change. The PINT(x)-CLR and PINT(x)-SET bits operate in the same manner.

Table V below summarizes the bit-map for the MP interrupt status ports when read:

TABLE V

| MP INTERRUPT CONTROL PORTS (READ) | | | |
|---|---|---|---|
| Bit | I/O | Name | Function |
| 7 | R | Reserved | Always Read 0 |
| 6 | R | Reserved | Always Read 0 |
| 5 | R | Reserved | Always Read 0 |
| 4 | R | Reserved | Always Read 0 |
| 3 | R | Reserved | Always Read 0 |
| 2 | R | Reserved | Always Read 0 |
| 1 | R | PINTEN<x> | CPU Prog Int Enable <x> |
| 0 | R | PINT<x> | CPU Prog Int <x> |

When the PINTEN<x> bit is set, or when a 1 is written to this bit, the CPU programmable interrupt for the level x is enabled. This bit is cleared upon reset of the computer system C, which occurs upon the assertion of a signal RESET. When the PINT<x> bit is set, a CPU programmable interrupt at the level x is requested if the corresponding PINTEN<x> was set. The PINT<x> bit is cleared upon reset or when this port is read.

The CPU interrupt mask port is used to select the logical processors that respond to a write to the programmable CPU interrupt port. The CPU interrupt mask port must always be written to before writing to the programmable CPU interrupt port.

Table VI below shows the bit-map for the CPU interrupt mask port:

TABLE VI

| CPU INTERRUPT MASK PORTS (0CD0h Write Only) | | | |
|---|---|---|---|
| Bit | I/O | Name | Function |
| 7 | W | CPU7 | CPU7 Prog Interrupt Enable |
| 6 | W | CPU6 | CPU6 Prog Interrupt Enable |
| 5 | W | CPU5 | CPU5 Prog Interrupt Enable |
| 4 | W | CPU4 | CPU4 Prog Interrupt Enable |
| 3 | W | CPU3 | CPU3 Prog Interrupt Enable |
| 2 | W | CPU2 | CPU2 Prog Interrupt Enable |
| 1 | W | CPU1 | CPU1 Prog Interrupt Enable |
| 0 | W | CPU0 | CPU0 Prog Interrupt Enable |

When any of the bits of the CPU interrupt mask ports shown in Table are VI set, the programmable interrupt for that CPU is enabled for writes to the programmable CPU interrupt port.

The programmable CPU interrupt port is used to generate an interrupt at the selected interrupt level on those processors enabled by the CPU interrupt mask port. The interrupt level x is binary encoded into four bits 3-0, referred to as LEVSELx, where bits 7-4 are reserved for future use and are not used. Table VII below summaries the bit-map for the CPU programmable interrupt port:

TABLE VII

| CPU PROGRAMMABLE INTERRUPT PORT (0CD3h Write Only) | | | |
|---|---|---|---|
| Bit | I/O | Name | Function |
| 7 | W | Reserved | Always Write 0 |
| 6 | W | Reserved | Always Write 0 |
| 5 | W | Reserved | Always Write 0 |
| 4 | W | Reserved | Always Write 0 |
| 3 | W | LEVSEL3 | Interrupt Level Select 3 |
| 2 | W | LEVSEL2 | Interrupt Level Select 2 |
| 1 | W | LEVSEL1 | Interrupt Level Select 1 |
| 0 | W | LEVSEL0 | Interrupt Level Select 0 |

Figure 5:
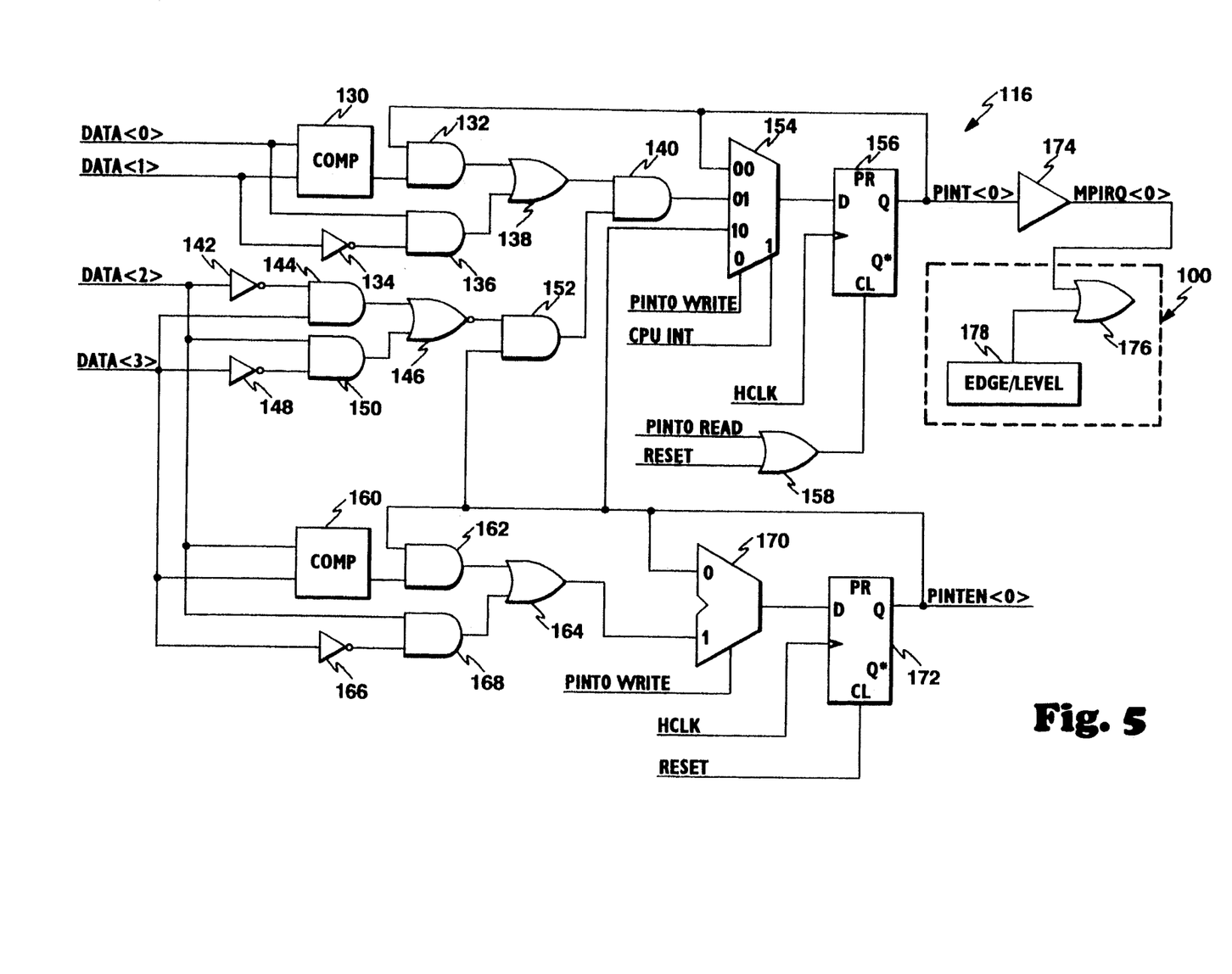
FIG. 5 is a schematic diagram of a representative portion of the multiprocessor interrupt logic of FIG. 4.

Referring now to FIG. 5, a schematic diagram of a representative portion of the MPINT 116 is shown. This representative portion only shows the MP programmable interrupt level 0, where it is understood that the remaining levels 1, 3–15 are substantially identical. The first four bits of the data lines from the ADEC 120, referred to as DATA<0 ... 3>, respectively, are received at the input of the MPINT 116. The DATA<0> and DATA<1> signals are input to a two-input exclusive-NOR comparator (COMP) 130, which has its output connected to one input of a two-input AND gate 132. The other input of the AND gate 132 is the PINT<0> signal. The DATA<1> signal is provided to the input of an inverter 134, which has its output connected to one input of a two-input AND gate 136. The other input of the AND gate 136 is connected to the DATA<0>. The outputs of the AND gates 132 and 136 are provided to the respective inputs of a two-input OR gate 138, which has its output connected to one input of a two-input AND gate 140.

The DATA<2> signal is provided to the input of an inverter 142, which has its output connected to one input of a two-input AND gate 144. The other input of the AND gate 144 is connected to the DATA<3> signal, and the output of the AND gate 144 is connected to one input of a two-input NOR gate 146. The DATA<3> signal is also connected to the input of an inverter 148 and the output of the inverter 148, is connected to one input of a two-input AND gate 150. The other input of the AND gate 150 is connected to the DATA<2> signal, where the output of the AND gate 150 is connected to the other input of the NOR gate 146. The output of the NOR gate 146 is connected to one input of a two-input AND gate 152 which has its other input connected to the PINTEN<O> signal. The output of the AND gate 152 is provided to the other input of the AND gate 140.

The output of the AND gate 140 is connected to the second input of a three input multiplexer 154, which has two enable inputs referred to as 0 and 1 respectively. The 0 enable input of the multiplexer 154 is connected to a write strobe signal referred to as PINT0-WRITE, which is asserted high when a write occurs to the MP interrupt port Int0 for level 0, located at hex port address 0CB0h. The 1 enable input of the multiplexer 154 is connected to a signal CPU-INT, which is true when 00h is written to the CPU programmable interrupt port at hex port address 0CD3h, and when the corresponding bit 0 for the CPU 20, or CPU0, of the CPU interrupt mask port at hex port address 0CD0h is set. The first input of the multiplexer 154 is connected to the PINT<0> signal and the third input is connected to the PINTEN<O> signal. In this manner, when the CPU-INT and PINT0-WRITE signals equal 00, 01 or 10, the first, second or third input, respectively, of the multiplexer 154 is selected.

The output of the multiplexer 154 is connected to the D input of a D flip-flop 156, which has its Q output providing the PINT<0> signal. The clock input of the D flip-flop 156 is connected to the HCLK signal and the clear input of the D flip-flop 156 is connected to the output of an OR gate 158. One input of the OR gate 158 is connected to a signal PINT0-READ, which is true when the MP interrupt port Int0 at hex port address 0CB0h is read. The other input of the OR gate 158 is connected to the RESET signal. The PINT<0> signal is provided generally through a buffer 174, which outputs the MPIRQ<0> signal provided to the PIC 100. In the preferred embodiment, the PIC 100 includes an OR gate 176 which receives the MPIRQ<0> signal at one input and the output of an edge level register 178 at its other input. For more information on the edge level detect logic within the edge level register 178 and other inputs of the PIC logic 100, please see U.S. Pat. No. 5,101,497, entitled "Programmable Interrupt Controller" to Culley, et al., which is hereby incorporated by reference.

The DATA<2> signal is also provided to one input of an exclusive-NOR comparator (COMP) 160, which is similar to the COMP 130, and also to one input of a two-input AND gate 168. The DATA<3> signal is provided to the other input of the COMP 160 and to the input of an inverter 166, which has its output connected to the other input of the AND gate 168. The output of the COMP 160 is connected to one input of a two-input AND gate 162 which has its other input connected to the PINTEN<O> signal. The output of the AND gate 162 is connected to one input of a two input OR gate 164, which has its other input connected to the output of the AND gate 168. The output of the OR gate 164 is connected to the second input of a two-input multiplexer 170, which has its first input connected to the PINTEN<0> signal. The enable input of the multiplexer 170 is connected to the PINT0-WRITE signal. The output of the multiplexer 170 is connected to the D input of a D flip-flop 172, which has its Q output providing the PINTEN<O> signal. The clock input of the D flip-flop 172 is connected to the HCLK signal, and the clear input of the D flip-flop 172 is connected to the RESET signal.

The operation of the portion of the MPINT 116 shown in FIG. 5 will now be briefly described. To enable the programmable interrupt level 0 for the CPU 20, a hex value of 04h is written to the MP interrupt control part into at the hex port address 0CB0h. This write operation is performed by the processor 72 through the local I/O bus to the DSP 88a, or by another processor through the index registers. This write causes the DATA<3 ... 0> signals to be 0100, respectively, and also asserts the PINT0-WRITE strobe signal to be high. The second input of the multiplexor 170 is temporarily selected while the output of the OR gate 164 is asserted high, so that the PINTEN<O> signal is latched high by the D flip-flop 172. A subsequent write of 01h to the MP interrupt port int0 for the CPU 20 causes the output of the AND gate 140 to be asserted high while the second input of the multiplexer 154 is selected. The PINT<0> signal is thus latched high by the D flip-flop 156, which causes the MPIRQ<0> interrupt request signal to be asserted to the PIC 100.

Once the PINTEN<0> signal is high, the PINT<0> signal can also be asserted by writing a 01h value to the CPU interrupt mask port at hex port address 0CD0, which enables the CPU 20 for writes to the programmable CPU interrupt port located at 0CD3. A write of 00h to the programmable CPU interrupt port causes the CPU-INT signal to be asserted, which selects the third input of the multiplexor 154, which is the PINTEN<O> signal. Since the PINTEN<O> signal is high, the PINT<0> signal is latched high by the D flip-flop 156. Of course, the write to the CPU interrupt mask and programmable CPU interrupt ports should be performed with one doubleword write to the EISA address 0CD0h.

The interrupts can be cleared several ways. A reset of the computer system C asserts the RESET signal thereby clearing the D flip-flops 156 and 172, thus setting the PINT<0> and PINTEN<O> signals to zero. A write of 02h to the MP interrupt port into causes the AND gate 140 to assert a zero at its output, where the second input of the multiplexor 154 is also selected. The D flip-flop 156 is subsequently cleared. A write of 08h to the MP interrupt port into clears the D flip-flop 172, thus clearing the PINTEN<0> signal. Alternatively, a read of the MP interrupt port INT0 asserts the PINT0-READ strobe signal high, which resets the D flip-flop 156.

It can now be appreciated that the arrangement of DMA, interrupt and timer functions according to the present invention allows symmetrical multiprocessing which was not feasible using a single ESP in prior systems. In the preferred embodiment, a CSP replaces the ESP and retains the arbitration controller and most of the DMA controller functions. A DSP is preferably provided for each CPU in a multiprocessor system, where each DSP includes timers, a local interrupt controller, local NMI logic and local DMA logic. A MUX bus is provided between the CSP and the DSPs and the CSP includes a bus interface to control the MUX bus. The local DMA logic allows each CPU to have independent control over the centrally located DMA controller, which is shared by all the CPUs.

The CSP conveniently receives a plurality of system and nonmaskable interrupt signals, DMA terminal count signals and other miscellaneous signals and transfers these signals to the DSPs on the MUX bus. Although all of the DSPs receive all of these signals, a system programmer can mask or disable all of the interrupts so that each processor handles only those interrupts desired by the programmer. Multiprocessor interrupt sharing allows CPU programmable interrupts at any level to be shared among the CPUs. Each processor has its own set of timers so that any CPU can handle any desired timer functions chosen by the user. Thus, the present invention allows symmetric multiprocessing providing flexibility to enhance system performance.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A computer system, comprising:
 a system board;
 an expansion bus located on said system board;
 a plurality of interchangeable card connectors located on said system board and coupled to said expansion bus, each said interchangeable card connector for receiving interchangeable cards;
 a communications bus located on said system board
 a plurality of CPU card connectors located on said system board and coupled to said communications bus and said expansion bus, each said CPU card connector for receiving a CPU card;
 at least one CPU card, each said CPU card comprising:
  a processor coupled to said expansion bus;
  a distributed peripheral coupled to said processor and said communications bus, said distributed peripheral comprising:
   interface means coupled to said processor and said communications bus;
   an interrupt controller coupled to said interface means;
   nonmaskable interrupt logic coupled to said interface means; and
   local direct memory access logic coupled to said interface means, said local direct memory access logic comprising:
    a register for storing terminal count status bits of a direct memory access controller for use by said processor; and
    at least one byte pointer storage means, said byte pointer storage means storing byte pointer bits for use by said processor when programming a direct memory access controller; and
 a central peripheral located on said system board and coupled to said communications bus and said expansion bus, said central peripheral comprising:
  means coupled to said communications bus for broadcasting information including said terminal count status bits to said distributed peripheral and for receiving said byte pointer bit from said distributed peripheral;
  a direct memory access controller coupled to said expansion bus and said broadcasting means for providing said terminal count status bits to said broadcasting means, for receiving said byte pointer bits and for controlling direct memory access operations on said expansion bus;
  a refresh controller coupled to said expansion bus for providing refresh cycles to memory located on said expansion bus; and
  an arbitration controller coupled to said refresh controller, said direct memory access controller and said expansion bus for prioritizing control of said expansion bus between said refresh controller, said direct memory access controller, devices connected to said expansion bus in said interchangeable card connectors and said CPU card.

2. The computer system of claim 1, wherein said broadcasting means further includes means for receiving a plurality of nonmaskable interrupt signals and for providing corresponding signals on said communications bus.

3. The computer system of claim 1, wherein said broadcasting means further includes means for receiving a plurality of system interrupt signals and for providing corresponding signals on said communications bus.

4. The computer system of claim 1, wherein said distributed peripheral further comprises a plurality of timers coupled to said interface means.

5. The computer system of claim 1, wherein said processor on each said CPU card includes:
 a microprocessor;
 a cache memory system coupled to said microprocessor;
 cache memory interface means coupled to said cache memory system, said distributed peripheral and said expansion bus for interfacing said cache memory system with said distributed peripheral and said expansion bus.

6. The computer system of claim 5, wherein
 said direct memory access controller further includes programmable registers including address and count registers;
 said cache interface means further includes means for detecting said processor executing a cycle to said expansion bus to access said direct memory access controller address and count registers, and for providing an access signal to said distributed peripheral interface means indicative of said processor accessing said address and count registers; and said distributed peripheral further includes means for receiving said access signal and providing said byte pointer bits to said central peripheral on said communications bus if said access signal indicates said processor is accessing said address and count registers.

7. The computer system of claim 6, wherein said direct memory access controller further comprises a direct memory access status register for containing terminal count status bits;

said cache interface means further providing said access signal if said processor executes a cycle to said expansion bus to access said status register;

said central peripheral further includes means for detecting cycles on said expansion bus and for executing a data cycle on said communications bus for retrieving said terminal count status bits from said distributed peripheral; and wherein said distributed peripheral provides said terminal count status bits on said communications bus if said access signal indicates said processor is accessing said status register.

* * * * *

UNITED STATES PATENT AND TRADEMARK OFFICE
CERTIFICATE OF CORRECTION

PATENT NO.  : 5,437,042
DATED       : JULY 25, 1995
INVENTOR(S) : PAUL R. CULLEY ET AL.

It is certified that error appears in the above-identified patent and that said Letters Patent is hereby corrected as shown below:

In col. 21, line 54, after "board" insert --;--.

Signed and Sealed this

Third Day of October, 1995

BRUCE LEHMAN

*Attest:*

*Attesting Officer*          Commissioner of Patents and Trademarks